United States Patent [19]
Vanderpool

[11] 3,717,361
[45] Feb. 20, 1973

[54] SELECTIVELY OPERABLE ECCENTRIC WHEEL MOUNT

[76] Inventor: Charles C. Vanderpool, R. D. No. 1, Waverly, N.Y.

[22] Filed: Oct. 4, 1971

[21] Appl. No.: 186,204

[52] U.S. Cl..............................280/229, 287/DIG. 8
[51] Int. Cl. ..............................................B60b 27/00
[58] Field of Search .......301/105 R, 105 B; 280/229; 287/DIG. 8, 52.04, 52 R

[56] References Cited

UNITED STATES PATENTS 3,371,944   3/1968   Daniels..................................280/229

Primary Examiner—Richard J. Johnson
Assistant Examiner—Reinhard Eisenzopf
Attorney—F. P. Keiper et al.

[57] ABSTRACT

A hub assembly selectively operable to position an axle either concentrically or eccentrically with respect to a wheel during rotation of the wheel. In a preferred embodiment, the assembly is mounted on one or both wheels of a bicycle to provide a normal ride or a "galloping" action in accordance with actuation by the operator through movement of a lever, or the like. Particular advantages of the structure are that normal mounting and operation of conventional coaster brakes is possible, and that the actuating lever may be held in the actuating position after movement of the axle to the opposite position.

10 Claims, 8 Drawing Figures

PATENTED FEB 20 1973

Charles C. Vanderpool
INVENTOR.

BY Charles S. McGuire
ATTORNEY

Charles C. Vanderpool
INVENTOR.

BY Charles S. McGuire
ATTORNEY

SELECTIVELY OPERABLE ECCENTRIC WHEEL MOUNT

The present invention relates to wheel mounting assemblies wherein the axle may be selectively positioned either on or off the center of the wheel.

Many types of mounting assemblies have been provided for selectively varying the position of an axle with respect to the wheel through which it passes. A vehicle carried on the axle will, of course, have horizontal, linear motion when the axle is concentric with the wheel and vertical as well as horizontal motion when it is eccentric. The latter may be desirable for a number of purposes, among which is the recreational feature provided by a bicycle, or other such vehicle, which may selectively be made to travel with a "galloping" action. Prior art hub assemblies which have this feature are generally not suited for incorporation with the usual coaster brake assemblies on the rear wheel of a bicycle. Furthermore, friction brakes, of the type that engage the rim, are difficult to use in the usual manner because they are affixed to the frame which may be moving up and down with respect to the wheel, as well as linearly with it.

Accordingly, a principal object of the present invention is to provide a hub assembly for a bicycle which may be actuated to provide an off-center mounting of the axle in the wheel which is suitable for mounting in conjunction with conventional coaster brake apparatus.

A further disadvantage of some selectively operable, off-center axle actuating structures is that the lever which is moved to change the axle position must be released before the wheel makes one complete revolution after the position change. This is due to the fact that a cam, or other such actuating device, is commonly used to move a pin or keeper in or out of a slot to allow movement of the axle to the alternate position, and unless the cam is moved out of the path of the pin, the assembly may be damaged by contact of the pin and cam on the next revolution. A further object of the present invention is to overcome this disadvantage and provide a structure wherein the actuating lever may be left in the engaged position after the axle has changed positions with no ill effects.

In a more general sense, the object of the invention is to provide a novel and improved hub assembly allowing selective concentric or eccentric positioning of an axle with respect to the wheel mounted thereon.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
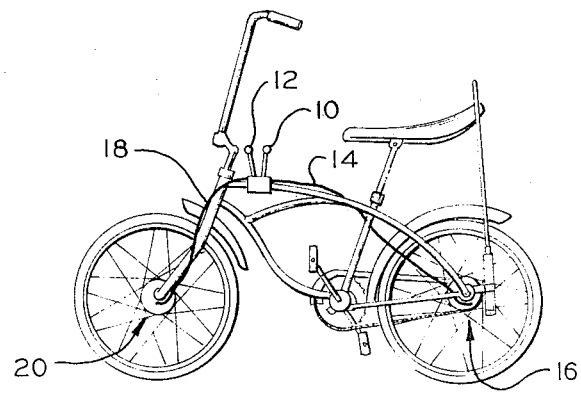
FIG. 1 is an elevational view of a bicycle incorporating the wheel mount of the present invention on both front and rear wheels.

As previously mentioned, the preferred embodiment of the invention is especially intended for combination with an otherwise conventional bicycle. The invention may be incorporated in the wheel mounts of either the front or back wheel, or with both wheels, as shown in FIG. 1. The front and rear hub assemblies may be identical for purposes of the present invention, with the rear axle carrying the chain sprocket and coaster brake assembly in accordance with conventional practice. As explained later in more detail, the hub assemblies are actuated to move between concentric and eccentric positions of the axles with respect to the wheels by means of manually operable levers 10 and 12, affixed to the cross bar, handle bars, or some other convenient support. Lever 10 is connected by cable 14 to the rear hub assembly, denoted generally by reference numbered 16, and lever 12 is connected by cable 18 to front hub assembly 20. Cables 14 and 18 preferably comprise relatively stiff wires, adapted to transmit motion in both directions, within hollow, flexible guides (not shown) attached to the frame at appropriate points by clips, or other fasteners.

Figure 2:
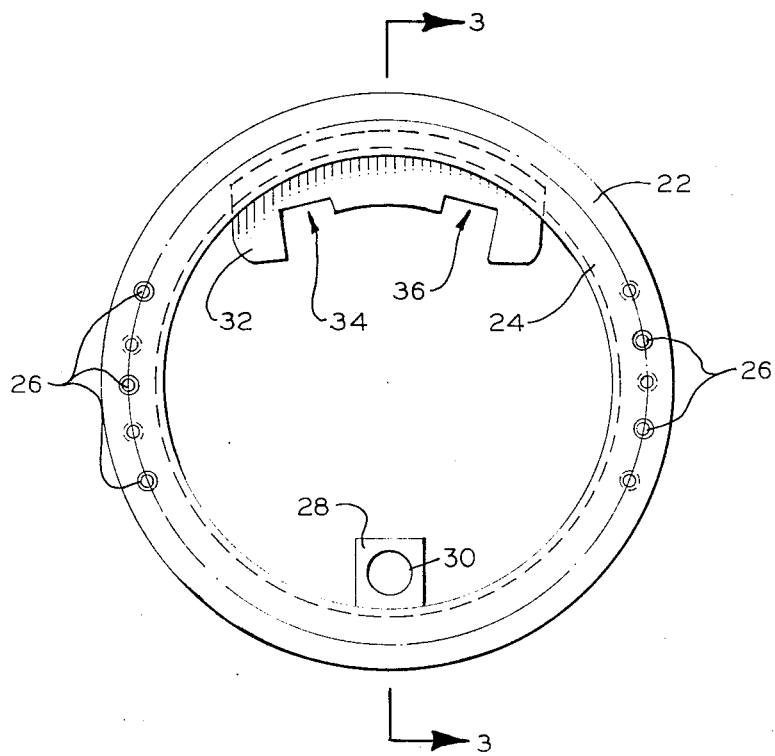
FIG. 2 is an end view of the outer portion of the assembly.

The outer portion of the hub assembly is shown in FIG. 2, flanges 22 being integrally formed with outer hub 24. Openings 26 are provided around flange 22 for attachment of the inner ends of the wheel spokes. Fixedly attached to the inner side of cylinder 22 are mounting block 28, having opening 30 extending therethrough, and positioning bracket 32, having spaced notches 34 and 36 facing the inside of the hub. In the illustrated embodiment, the portion of bracket 32 having the notches extends through an elongated opening in outer hub 24 and an outer portion of the bracket is affixed to the hub as seen in FIG. 3.

Figure 3:
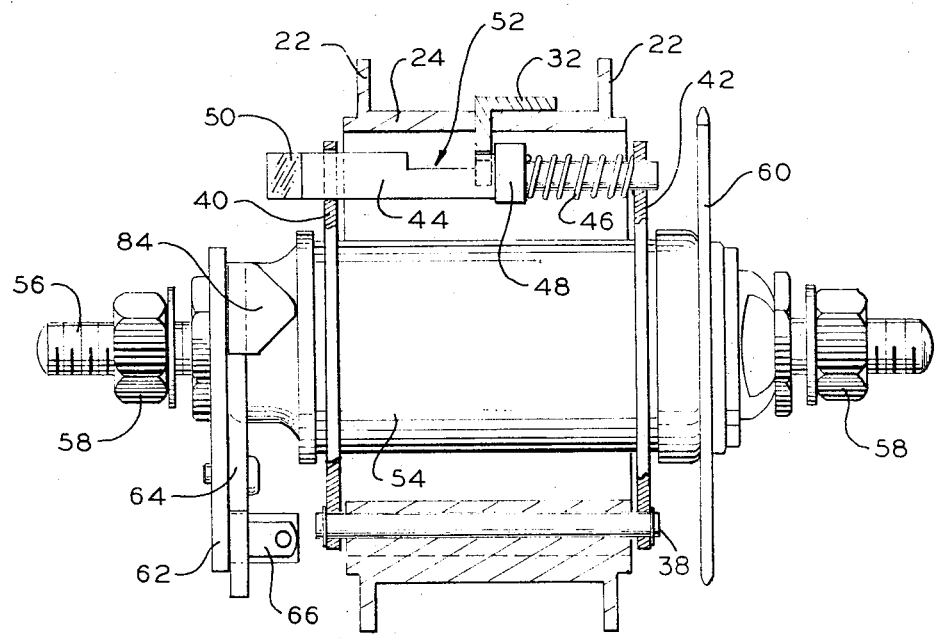
FIG. 3 is an elevational view of the complete hub assembly, with the outer portion in section on the line 3—3 of FIG. 2.

As also shown in FIG. 3, pin 38 extends through opening 30 in block 28 to provide a pivotal mounting at its opposite ends for discs 40 and 42. On the sides of discs 40 and 42 opposite their pivotal mountings on pin 38, appropriate openings are provided for axially slideable positioning pin 44. Spring 46 is compressed between disc 42 and shoulder 48 on pin 44 to bias the pin toward the left, as seen FIG. 3. Shoulder 48 engages bracket 32 to limit the extent of movement of pin 44. End portion 50 of the pin extends past disc 40 and may be engaged by means described later to move pin 44 to the right, against the biasing force of spring 46. When shoulder 48 is positioned against bracket 32, the portion of pin 44 adjacent shoulder 48 is retained in one of notches in the bracket. Movement of the pin toward the right, against the bias of spring 46, will move notch 52 in the pin into registration with the portion of bracket 32 between notches 34 and 36, thereby allowing movement of the pin 44 from one of the positioning bracket notches to the other. In so moving, discs 40 and 42 are rotated about pin 38, as described later.

Inner hub 54 comprises the usual cylinder containing the bearing assemblies upon which the wheel rotates. Axle 56 supports the bicycle frame, retained thereon by means of nuts 58. Chain sprocket 60 transmits rotation to inner hub 54 in the conventional manner and, through the previously described discs and outer hub structure, to the wheel. Arm 62 is also mounted on axle 56 and is affixed to the frame as part of the usual coaster brake assembly. Actuating element 64 is slideably mounted on arm 62 for reciprocal movement by means of cable 14, extending from lever 10 to a fixed connection on the other end to ear 66 of element 64.

Figure 4:
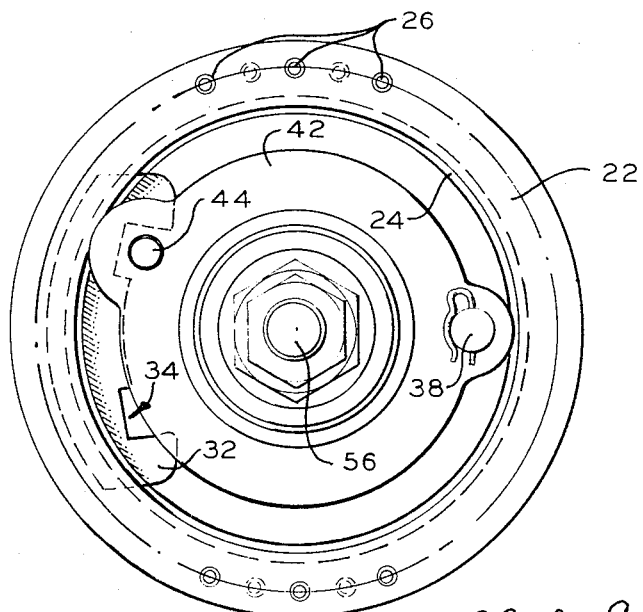
FIGS. 4 and 5 are end views as seen from the left of FIG. 3, of the inner and outer, relatively moveable, portions of the assembly, shown with the axle in the concentric and eccentric positions, respectively.

Since inner hub 54 is movable about pin 38 with respect to outer hub 24, axle 56 is movable with respect to the center of the wheel. The two relative positions of the axle and wheel center are defined by the positions of the elements when pin 50 is retained in either of the two notches in positioning bracket 32. In FIG. 4 the elements are seen in end view with pin 50 retained in notch 36. Axle 56 is concentric with the center of outer hub 24, and thus with the center of the wheel. With pin 50 moved to notch 34 in positioning bracket 32, the elements are in the positions shown in FIG. 5 with axle 56 off-center with respect to the outer hub and wheel. Therefore, as the wheel rotates in moving along a level surface the frame of the bicycle will move up and down by a distance determined by the amount of offset of the center of axis 56 from the center of the wheel. An essentially sine wave motion or "galloping" action of the bicycle seat is thereby achieved.

Figure 5:
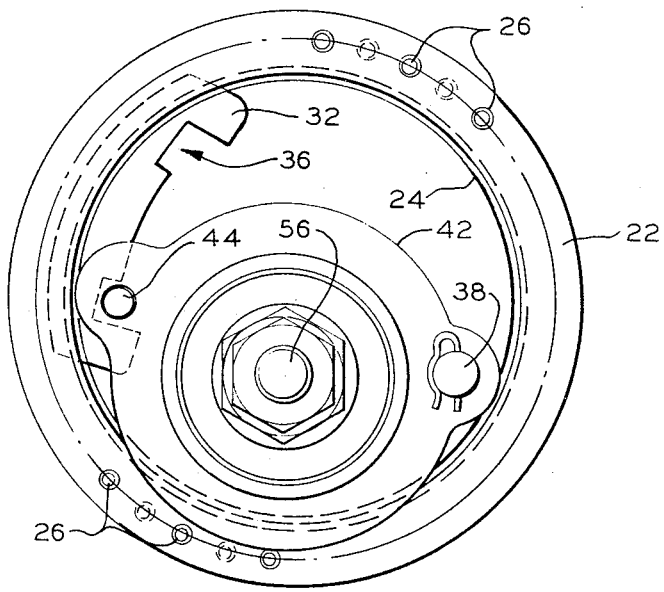
Figure 6:
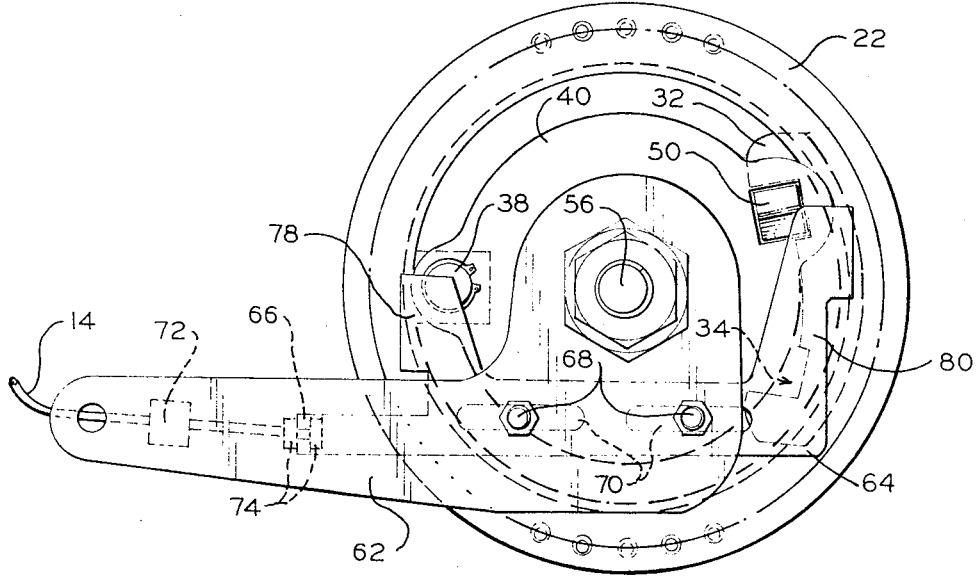
FIG. 6 is an end view of the assembly from the side opposite that shown in FIGS. 4 and 5.

In FIG. 6 the elements are shown from the end opposite that of FIGS. 4 and 5, with axle 56 in the concentric position, i.e., with pin 50 in notch 36. The slideable mounting of element 64 on arm 62 is shown more clearly, fixed bolts 68 on the arm extending loosely through slots 70 in the actuating element. In the position shown, the bolts are substantially at the center of the slots; element 64 may be moved in either direction from this position by appropriate movement of cable 14. Block 72 may be provided on arm 62 as a guide for cable 14. The end of the cable is fixed to ear 66 by retainers 74.

Figure 7:
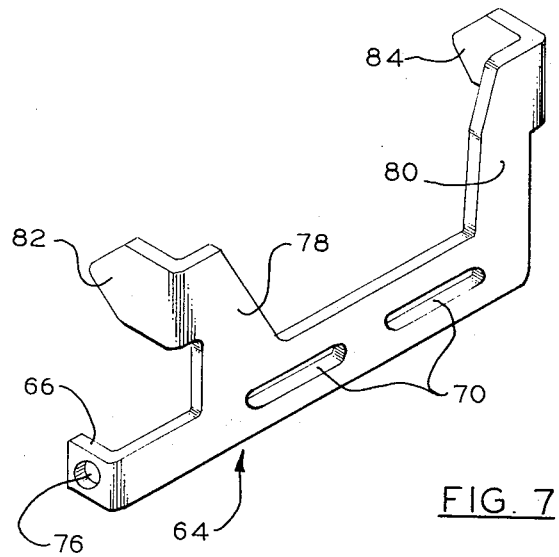
FIG. 7 is a perspective view of the actuating element.

Actuating element 64 is shown in more detail in FIG. 7. Opening 76 in ear 66 is provided for insertion of the cable. Arms 78 and 80 terminate in bent-over end portions 82 and 84, respectively. The end portions are provided for engaging end 50 of pin 44 when moved into the path of rotation thereof, thus moving the pin axially and disengaging it from the notch in positioning bracket 32 wherein it is engaged.

When element 64 is at the center of its sliding movement, as shown in FIG. 6, pin 44 will not engage either of end portions 82 and 84 during rotation. The wheel, of course, rotates to move the bicycle in only the forward direction during normal operation; that is, the hub assembly rotates in the counterclockwise direction as shown in FIG. 6. If element 64 is moved to the left from its position of FIG. 6, on the next revolution pin 44 will contact end portion 84 of arm 80. The engaging surfaces end 50 of pin 44 and end portion 84 are shaped so that the end portion acts as a cam, moving pin 44 axially as it engages and moves past end portion 84. When pin 44 moves sufficiently that notch 52 in the pin is in registration with the portion of bracket 32 between the two notches therein, the weight of the bicycle and rider, applied through the frame to axle 56, will cause the axle to move downwardly. Discs 40 and 42 will rotate about pin 38 until pin 44 engages the portion of bracket 32 adjacent notch 34. As the end of pin 44 moves out of engagement with end portion 84, spring 46 will move the pin axially outward to engage in notch 34 with axle 56 in the eccentric or off-center position with respect to the wheel. If element 64 remains in this position on subsequent revolutions of the wheel, pin 44 will again be engaged and moved axially by end portion 84. However, the weight applied downwardly on axle 56 will tend to rotate the inner hub and discs in a clockwise direction about pin 38 and notch 52 is not deep enough to permit movement past the notch in bracket 32; that is, pin 44 can move only between the notches in the bracket, not past them. Thus, as pin 44 moves out of engagement with end portion 84 it will immediately move back into notch 34 with no effect on the position of axle 56.

Movement of element 64 back to the central position will likewise have no effect on the position of axle 56 since neither of end portions 82 nor 84 will contact pin 44. Movement of cable 14 to cause element 64 to move to the right from the position shown in FIG. 6 will bring end portion 82 on arm 78 into the path of pin 44. Axle 56 will be above the center of the wheel when pin 44 is moved out of notch 34. Thus, the weight on the axle will cause inner hub 54 and discs 40 and 42 to rotate about pin 38 in a counterclockwise direction. Pin 44 will drop from one end of bracket 32 to the other, moving from notch 34 to notch 36 so that axle 56 is again concentric with the center of the wheel. If element 64 is left in this position, pin 44 will again engage end portion 82 with each subsequent rotation of the wheel, but this will have no effect on the position of axle 56 since pin 44 cannot move in a counterclockwise direction beyond notch 36. Thus, the pin will merely be disengaged from and immediately reengaged in notch 36.

Figure 8:
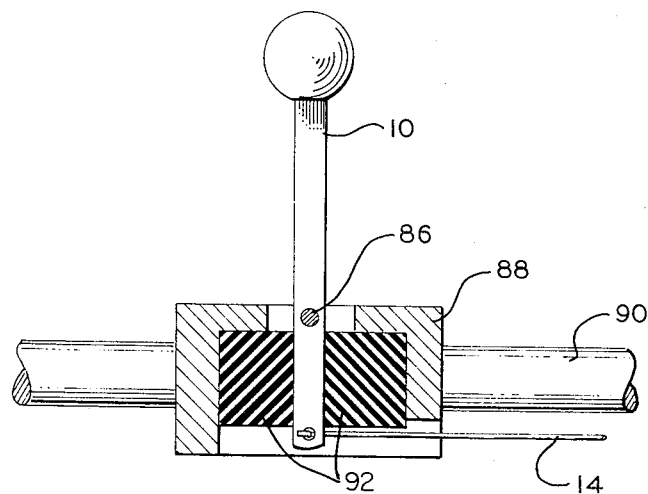
FIG. 8 is an elevational view, in section, of the manually operable actuating lever.

In FIG. 8 is shown structure for maintaining the manually operable levers in a central position. Lever 10 is pivoted at 86 to housing 88, attached by any convenient means to portion 90 of the bicycle frame. Within housing 88 are biasing means tending to maintain lever 10 in the position shown. As illustrated, the means comprise resilient blocks 92, of firm rubber or similar material, but may comprise springs, detents or other biasing means. Lever 10 may be moved in either direction from the position shown, thereby moving the end of cable 14 to move actuating element 62 as desired. Once released, the lever will be moved back to the central position, which corresponds to the central position in the movement of element 62.

The elements of the hub assembly for the front wheel would be identical to those described in connection with the rear wheel except that no chain sprocket or brake arm would be required. A similar arm for slideable mounting of the actuating element corresponding to element 64 would, however, be provided. The unit will operate equally well on either or both wheels and does not interfere in any way with the otherwise normal operation of the bicycle, including operation of the conventional coaster brake. Furthermore, actuation is simple and safe, a single lever being provided for actuation of each hub assembly, movable in opposite directions to cause movement of the axle between concentric and eccentric positions in the wheel. The lever is automatically centered, but if it is held in one position or the other for subsequent rotations of the wheel after the axle has been moved to the alternate position, there will be no effect except that the positioning pin will move in and out on each revolution.

What is claimed is:

1. A wheel hub assembly allowing movement of the axle between concentric and eccentric positions with respect to the wheel during rotation thereof, said assembly comprising:
   a. an outer hub fixedly and concentrically mounted with respect to the wheel;
   b. an inner hub through which the axle passes;
   c. means for mounting said inner hub within said outer hub for movement with respect thereto between first and second positions, wherein the axle is concentric and eccentric, respectively, with the center of said outer hub;
   d. retaining means releasably holding said inner hub in either of said first and second positions, and movable with said hubs during rotation thereof;
   e. actuating means selectively movable between a first actuating position, in the path of movement of a portion of said retaining means when the axle is in the concentric position, and a second actuating position, in the path of movement of said portion when the axle, is in the eccentric position;
   f. said retaining means and said actuating means being so constructed and arranged that contact of said portion with said actuating means is effective to move said retaining means out of holding engagement to allow movement of said inner hub to move the axle to the opposite of said concentric and eccentric positions.

2. The invention according to claim 1 wherein said actuating means is selectively movable from a central, reference position in a first direction to said first actuating position and in a second direction, opposite to said first direction, to said second actuating position.

3. The invention according to claim 2 wherein the portion of said retaining means contacted by said actuating means is slideably mounted for movement out of holding engagement by said actuating means and is moved back into holding engagement by biasing means.

4. The invention according to claim 3 wherein said portion of said retaining means comprises a pin mounted on said inner hub for releasable engagement with a bracket fixedly mounted on said outer hub.

5. The invention according to claim 3 wherein said actuating means comprises an element having two end portions, one of which contacts said portion of said retaining means when said actuating means is in said first actuating position, and the other of which contacts said portion of said retaining means when said actuating means is in said second actuating position.

6. The invention according to claim 1 wherein said inner hub is mounted for pivotal movement relative to said outer hub.

7. The invention according to claim 6 wherein the axis of rotation of said inner hub relative to said outer hub is parallel to the axle passing through said inner hub.

8. The invention according to claim 1 wherein said actuating means comprises a member mounted on a stationary arm adjacent said inner hub.

9. The invention according to claim 8 wherein the wheel hub assembly is incorporated in the rear wheel of a bicycle equipped with a coaster brake and said stationary arm comprises the coaster brake arm.

10. The invention according to claim 9 wherein said actuating means is biased toward a central, reference position and is manually movable in opposite directions away from said reference positions to said first and second actuating positions, respectively.

* * * * *